Figure 1:
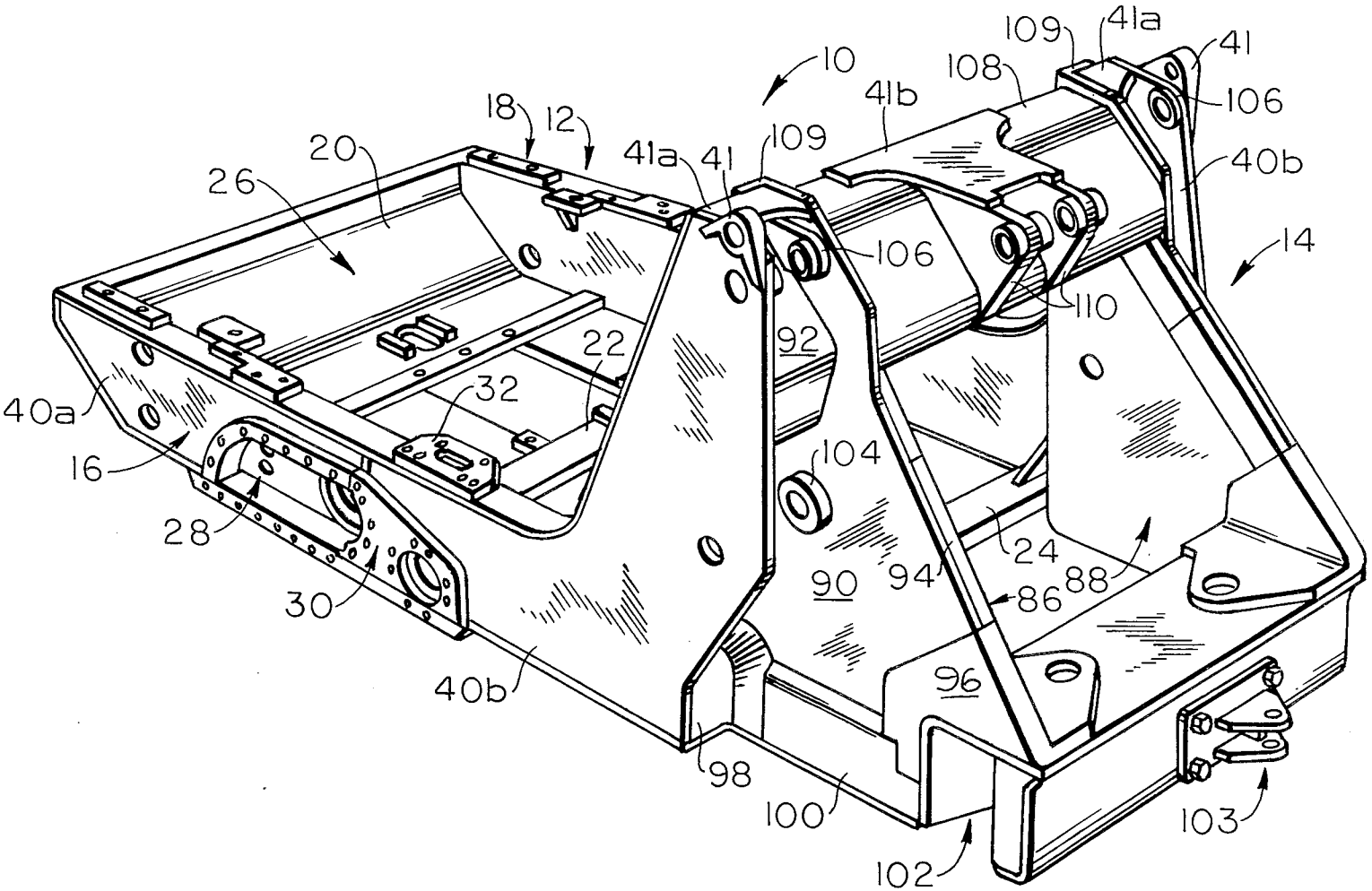
Figure 2:
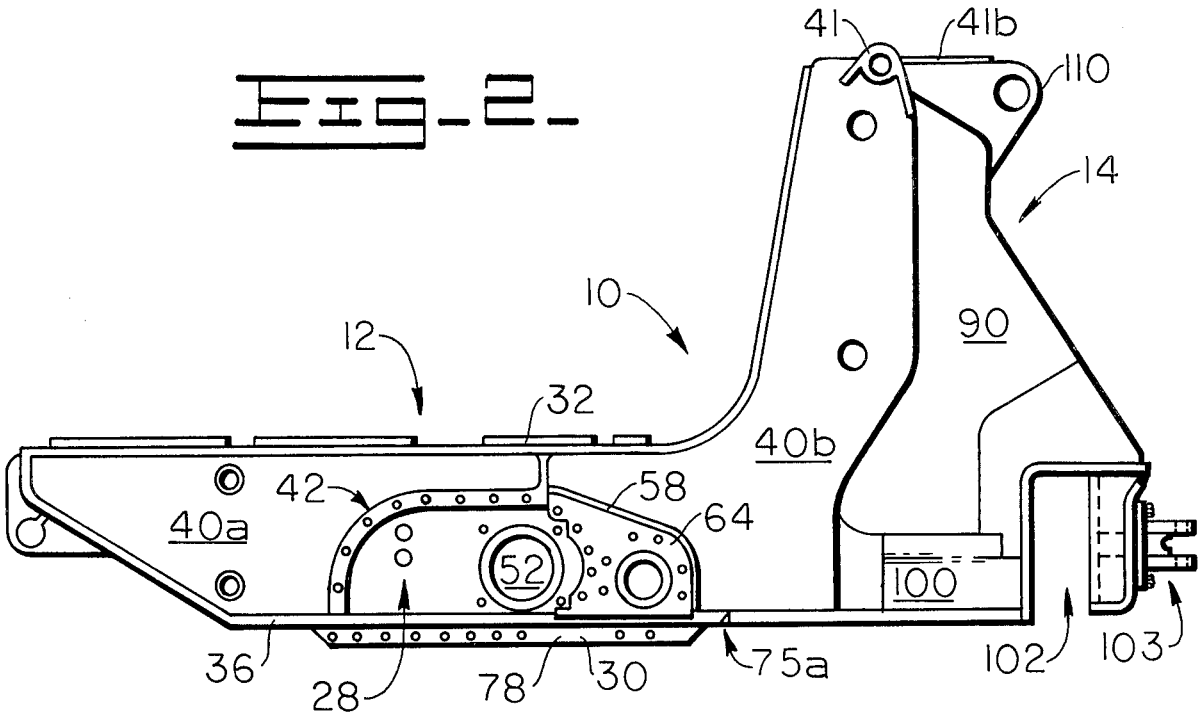
Figure 4:
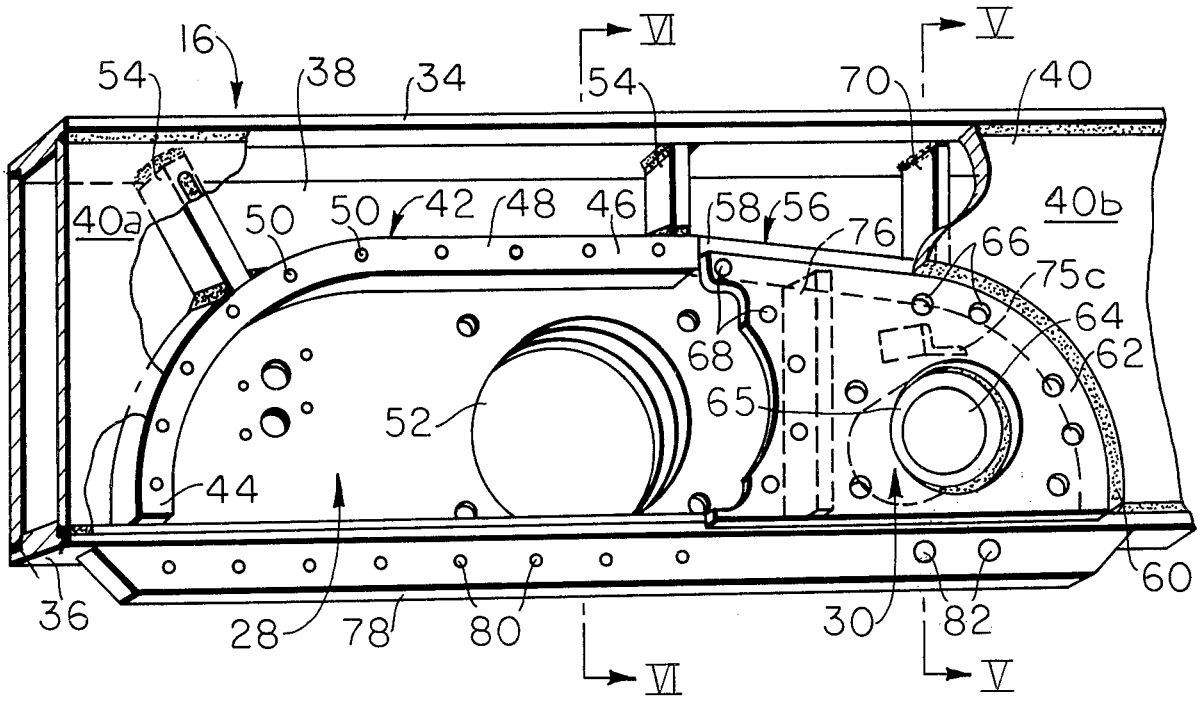
Figure 3:
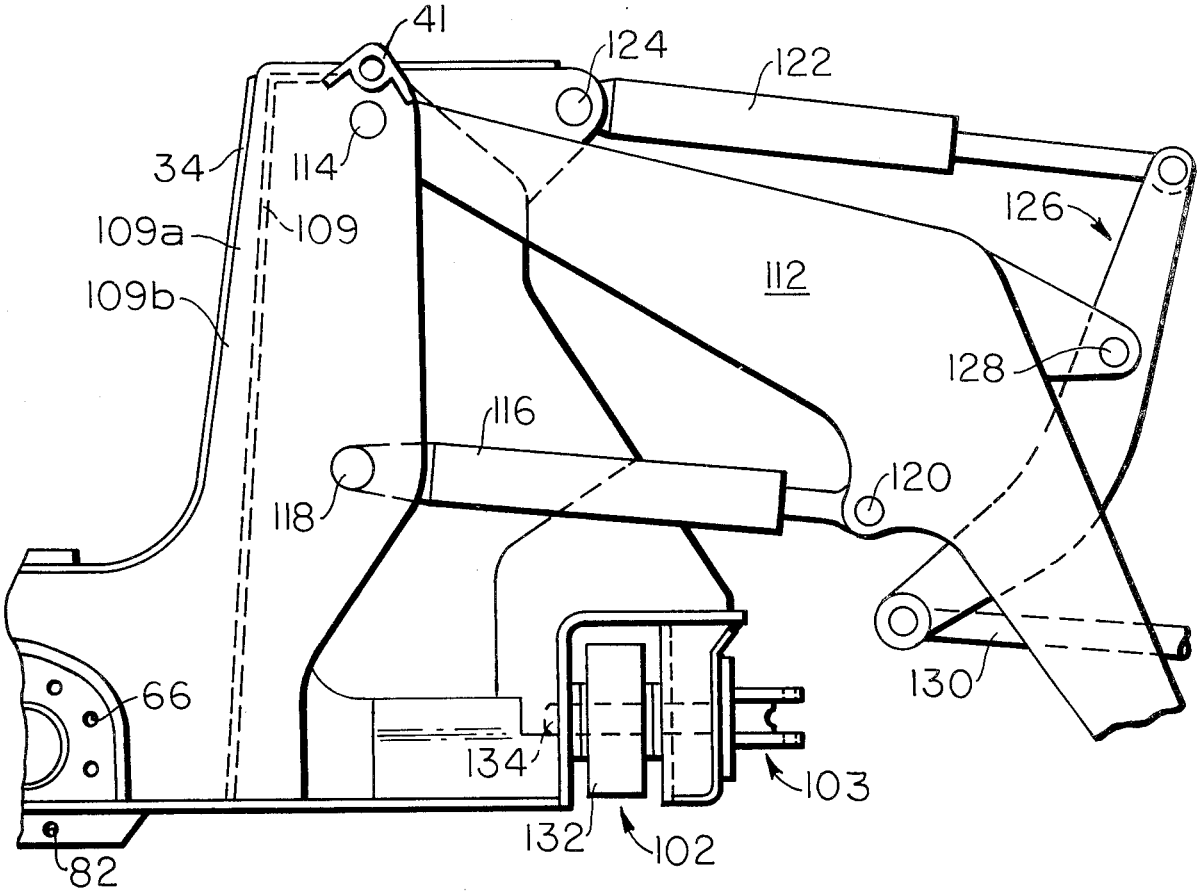
Figure 5:
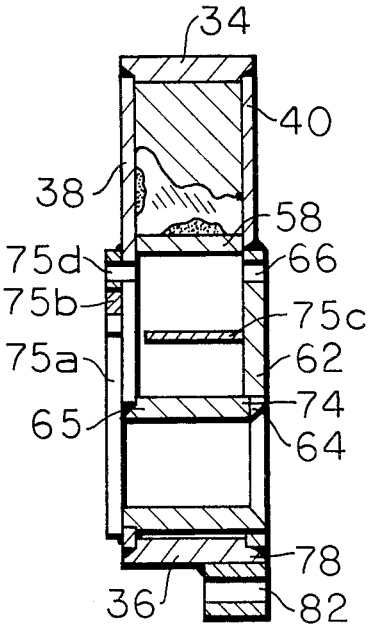
Figure 6:
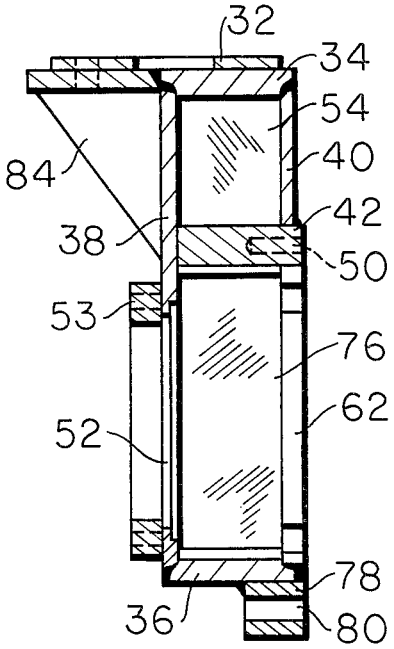

United States Defensive Publication [19] (H) [11] T966,007

Liehr et al. [43] Jan. 3, 1978

[54] MAIN FRAME FOR A LOADER VEHICLE

[75] Inventors: Douglas P. Liehr, Bettendorf; Robert A. Sutton, Davenport, both of Iowa

[73] Assignee: Caterpillar Tractor Co., Peoria, Ill.

[21] Appl. No.: 813,726

[22] Filed: July 7, 1977

[51] Int. Cl.[2] ..... B62D 27/00

[52] U.S. Cl. ..... 296/28 R; 214/140

[57] ABSTRACT

An integral welded main frame for a loader vehicle having a hydrostatic drive system, including a front frame section for supporting a load forwardly thereof, a pair of rails extending rearwardly from the front frame section, each of the rails including an upper plate and a lower plate joined by an outer plate and an inner plate to form a box section, the inner plate having an opening for receiving a hydraulic motor of the system, a first casing for a final drive of the system, including a first curved plate surrounding the final drive and the opening and extending from the inner plate to outside the outer plate, whereby each rail is reinforced in the area of the opening, a second casing for a pivot bar extendable through one of the rails, including a second curved plate welded to the outer plate and extending outside thereof, whereby each of the rails is reinforced in the area of the pivot bar, and a plurality of cross-members connecting the pair of side rails.

11 Claims, 3 Sheets Drawing,

10 Pages Specification

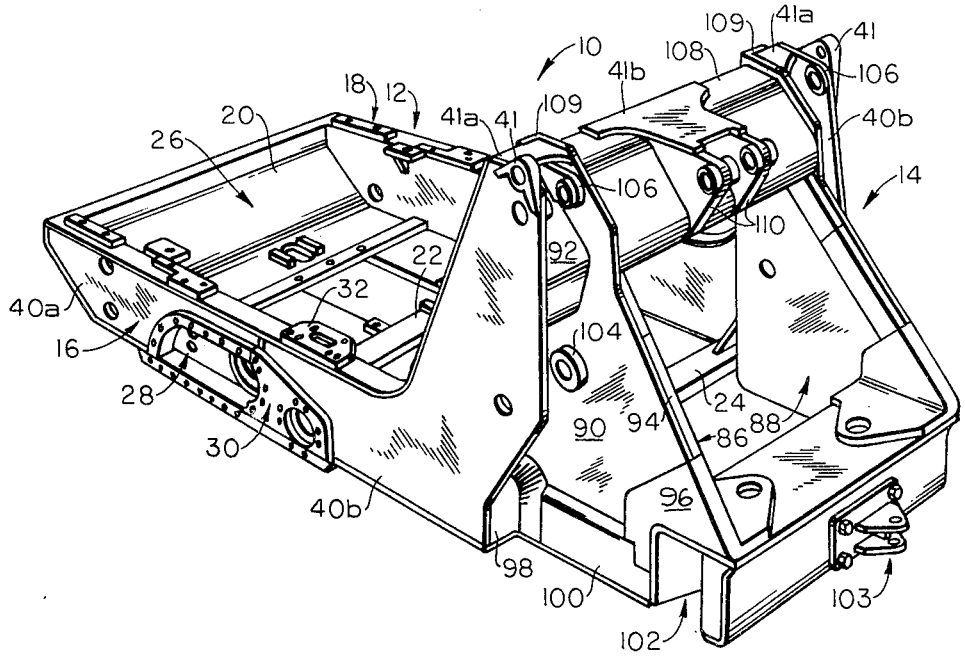

The file of this unexamined application may be inspected and copies thereof may be purchased (849 O.G. 1221, Apr. 9, 1968).